United States Patent
Aikawa (10) Patent No.: US 9,485,717 B2
(45) Date of Patent: Nov. 1, 2016

(54) MEASUREMENT REQUEST AND RESPONSE FOR RECEPTION QUALITY BASED NOTIFIED CELL IDENTIFICATION

(71) Applicant: FUJITSU LIMITED, Kawasaki-shi, Kanagawa (JP)

(72) Inventor: Shinichiro Aikawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 14/097,378

(22) Filed: Dec. 5, 2013

(65) Prior Publication Data

US 2014/0094168 A1    Apr. 3, 2014

Related U.S. Application Data

(63) Continuation of application No. PCT/JP2011/064471, filed on Jun. 23, 2011.

(51) Int. Cl.
*H04W 48/16* (2009.01)
*H04W 36/00* (2009.01)
*H04W 48/20* (2009.01)

(52) U.S. Cl.
CPC ......... *H04W 48/16* (2013.01); *H04W 36/0061* (2013.01); *H04W 48/20* (2013.01)

(58) Field of Classification Search
CPC ........... H04W 36/0061; H04W 36/04; H04W 36/06; H04W 36/08; H04W 36/14; H04W 36/16; H04W 36/18; H04W 36/20; H04W 36/22; H04W 36/34; H04W 36/36; H04W 36/38; H04W 48/20; H04W 48/16; H04W 48/06; H04W 48/10; H04W 48/12; H04W 88/00; H04W 36/30; H04W 72/02; H04W 72/04; H04W 72/085; H04W 24/00; H04W 24/10; H04W 76/021; H04W 36/0066; H04W 36/0072; H04W 36/0055; H04W 36/0077
See application file for complete search history.

(56) References Cited

U.S. PATENT DOCUMENTS 8,792,881 B2 * 7/2014 Koo et al. .................. 455/432.1
2005/0009528 A1   1/2005 Iwamura et al.
(Continued)

FOREIGN PATENT DOCUMENTS

JP    2001-119745      4/2001
WO    2010/079926 A2   7/2010
(Continued)

OTHER PUBLICATIONS

International Search Report, mailed in connection with PCT/JP2011/064471 and mailed Sep. 20, 2011.
(Continued)

*Primary Examiner* — Meless Zewdu
(74) *Attorney, Agent, or Firm* — Fujitsu Patent Center (57) ABSTRACT

A mobile communication system including a base station which sets a plurality of cells and a mobile station is provided. In the mobile communication system, the base station notifies the mobile station in communication through a first cell among the plurality of cells, of the identification information of at least one cell among the plurality of cells, which can be used for communication with the mobile station and instructs the mobile station to measure a reception state of radio signals. The mobile station detects, in response to the instruction from the base station, a cell for transmitting radio signals which the mobile station is able to receive, and when identification information of the detected cell matches any of the identification information of the at least one cell, the mobile station notifies the base station of the identification information of the detected cell.

7 Claims, 7 Drawing Sheets

(56) References Cited

U.S. PATENT DOCUMENTS

| | | | |
|---|---|---|---|
| 2006/0128412 A1* | 6/2006 | Mantha et al. | 455/522 |
| 2006/0142016 A1* | 6/2006 | Can | H04W 36/0094 455/449 |
| 2007/0026808 A1* | 2/2007 | Love | H04L 1/0026 455/67.7 |
| 2008/0057966 A1* | 3/2008 | Kwon | 455/446 |
| 2008/0207207 A1* | 8/2008 | Moe et al. | 455/439 |
| 2009/0042532 A1* | 2/2009 | Bienas | H04W 24/00 455/403 |
| 2009/0176490 A1* | 7/2009 | Kazmi et al. | 455/434 |
| 2009/0191862 A1* | 7/2009 | Amirijoo | H04W 36/0083 455/424 |
| 2010/0093358 A1* | 4/2010 | Cheong | H04W 36/0055 455/444 |
| 2010/0173663 A1* | 7/2010 | Umeda | H04L 1/0002 455/522 |
| 2010/0197298 A1* | 8/2010 | So | H04W 24/10 455/424 |
| 2010/0304682 A1 | 12/2010 | Choi et al. | |
| 2011/0269459 A1 | 11/2011 | Koo et al. | |
| 2012/0046066 A1 | 2/2012 | Tamura et al. | |
| 2012/0051329 A1 | 3/2012 | Hirano et al. | |
| 2012/0077445 A1 | 3/2012 | Konno et al. | |
| 2012/0094608 A1 | 4/2012 | Shi et al. | |
| 2012/0182879 A1 | 7/2012 | Tamura et al. | |
| 2012/0257588 A1 | 10/2012 | Umeda et al. | |

FOREIGN PATENT DOCUMENTS

| | | |
|---|---|---|
| WO | 2010/109764 | 9/2010 |
| WO | 2010/113490 A1 | 10/2010 |
| WO | 2010/113732 A1 | 10/2010 |
| WO | 2010/140347 | 12/2010 |
| WO | 2010/148961 A1 | 12/2010 |
| WO | 2011/039969 | 4/2011 |
| WO | 2011/039969 A1 | 4/2011 |
| WO | 2011/043396 | 4/2011 |

OTHER PUBLICATIONS

ZTE; "Additional measurement reporting"; 3GPP TSG-RAN WG2 Meeting #71bis, R2-105344, pp. 1-17, Oct. 11, 2010.

KROA—Office Action of Korean Patent Application No. 10-2013-7033622, mailed Feb. 11, 2015, with full English Translation.

JPOA—Office Action of Japanese Patent Application No. 2013-521389 dated Sep. 2, 2014 with English Translation of the Office Action.

JPOA—Office Action of Japanese Patent Application No. 2013-521389 dated Apr. 28, 2015, with partial English translation of the Office Action.

EESR—Extended European Search Report of European Patent Application No. 11868404.2 dated Mar. 19, 2015.

KROA—Office Action of Korean Patent Application No. 10-2013-7033622 mailed on Aug. 20, 2015, with English translation.

CNOA—Office Action of Chinese Patent Application No. 201180071849.2 dated Jul. 22, 2016, with English translation of the Office Action.

* cited by examiner

MEASUREMENT REQUEST AND RESPONSE FOR RECEPTION QUALITY BASED NOTIFIED CELL IDENTIFICATION

CROSS-REFERENCE TO RELATED APPLICATION

This application is a continuation application of International Application PCT/JP2011/064471, filed on Jun. 23, 2011 and designated the U.S., the entire contents of which are incorporated herein by reference.

FIELD

The present invention relates to, for example, a measurement method for detecting a cell by a mobile station in communication through any of a plurality of cells being set by a base station, and relates to a mobile communication system, a mobile station, and a base station for realizing such a measurement method.

BACKGROUND

In a mobile communication system, applications that communicate a large amount of data such as those for streaming video data have been utilized. For this reason, technologies to improve a data communication speed in a mobile communication system have been researched. For example, as an example of such a technology, a Coordinated multi-point transmission/reception (CoMP) technology which simultaneously uses a plurality of cells for communication and Carrier Aggregation (CA) which simultaneously uses a plurality of frequency bands for communication have been proposed. The CoMP and CA technologies have been studied in Long Term Evolution-Advanced (LTE-Advanced) which is a communication standard, the standardization thereof having been made by Third Generation Partnership Project (3GPP).

In a mobile station that is in communication, when a handover occurs, for example, a mobile station measures cell radio strength and quality of frequency bands, which a base station specified for the mobile station, to measure quality or strength of received radio signals, then the mobile station reports to the base station identification numbers of cells which have sufficient signal strength and quality to be used for communication. Furthermore, in a mobile communication system implementing the CoMP or CA technology, the cell radio strength and quality is also measured when a cell or a frequency band to be used by a mobile station is added. Thus, a frequency at which a mobile station measures quality and strength of radio signals and a frequency at which measurement results are reported to a base station increase.

On the other hand, a technology is proposed in which power consumption and time for performing cell search by a mobile station are suppressed and complexity involved in design and administration is simplified (for example, refer to Japanese Laid-open Patent Publication No. 2001-119745). In the technology disclosed in Japanese Laid-open Patent Publication No. 2001-119745, by using grouped channel identifiers received from sectors, a mobile station which communicates with a plurality of base stations determines the sectors for use in communication. In this technology, channel identifiers which belong to a same group are assigned to sectors in a same base station. Then, the base station notifies visiting mobile stations of, for one of neighboring base stations, any one of channel identifies assigned to sectors of the one of neighboring base stations and of a group number to which the channel identifier belongs.

SUMMARY

When a mobile station performs radio communication, it may be preferable that cells used by the mobile station be limited to a plurality of cells or a plurality of frequency bands set by a single base station in order to communicate by implementing the CoMP or CA technology. The reason is that, when signaling delays between base stations are large, communication utilizing a plurality of cells set by a plurality of base stations may become impossible. It makes communication control easier for a mobile station to use a plurality of cells or frequency bands set by a same base station than to use a plurality of cells set by a plurality of base stations. However, in the technology disclosed in Japanese Laid-open Patent Publication No. 2001-119745, information about cells set by neighboring base stations located surrounding the base station being in radio communication with a mobile station is notified to the mobile station. Therefore, when received signal strength and quality for cells set by the neighboring base stations are sufficient for communication, the mobile station is to notify of identification numbers of the cells. In such a case, when the information about the cells of the neighboring base stations is notified, since the base stations being in radio communication with the mobile station are unable to add the cells for communicating with the mobile station, the information about the cells is merely to be discarded. Accordingly, in a cell radio strength and quality measurement for deciding whether or not addition of a cell is possible, communication for reporting information about cells of neighboring base stations by a mobile station wastes radio resources and increases processing loads.

According to an embodiment, a mobile communication system including a base station which sets a plurality of cells and a mobile station is provided. In the mobile communication system, the base station notifies the mobile station being in communication through a first cell among the plurality of cells of identification information of at least one cell among the plurality of cells which can be used to communicate with the mobile station and instructs the mobile station being in communication through the first cell to measure a reception state of radio signals. Meanwhile, in response to the instruction from the base station, the mobile station detects a cell transmitting a radio signal which the mobile station is able to receive and, when identification information of a detected cell matches any of the identification information of the at least one cell, notifies the base station of the identification information of the detected cell.

The object and advantages of the present invention are realized and achieved by the elements and combinations thereof which are particularly pointed out in the claims.

The above general description and the following detailed description are both illustrative and explanatory in nature and it is to be understood that they do not limit the present invention like the claims.

DESCRIPTION OF EMBODIMENTS

Hereinafter, with reference to drawings, a mobile communication system according to an embodiment will be explained.

In the mobile communication system, a base station notifies a mobile station that is in communication through any of a plurality of cells set by own base station, of identification numbers of cells, which can be used to communicate with the mobile station, among cells set by own base station. When having performed a cell radio strength and quality measurement to add cells to use for communication with the base station being in communication, the mobile station reports, to the base station, identification numbers of only those cells whose identification numbers match the identification numbers notified by the base station.

The present embodiment is assumed to be a mobile communication system conforming to, for example, LTE-Advanced. However, the present embodiment may be other various mobile communication systems in which, one base station setting a plurality of cells, a mobile station can perform radio communication with the base station through the plurality of cells.

Figure 1:
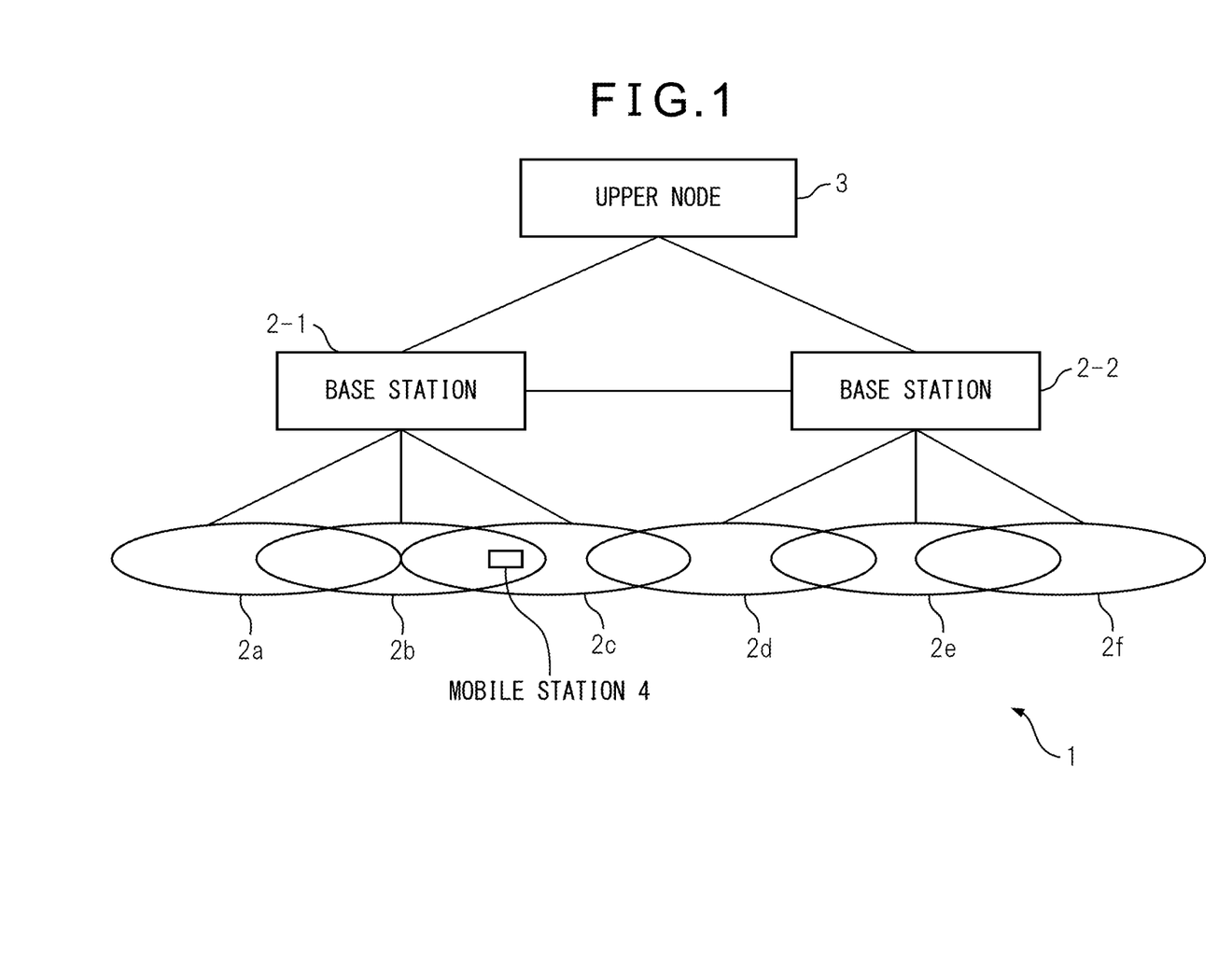
FIG. 1 is a schematic diagram of a mobile communication system according to an embodiment.

FIG. 1 is a schematic diagram of a mobile communication system according to an embodiment. A mobile communication system 1 includes base stations 2-1 and 2-2, an upper node device 3, and a mobile station 4. The base stations 2-1 and 2-2 are each connected to the upper node device 3 according to an S1 interface. Furthermore, the base stations 2-1 and 2-2 may be connected each other, for example, according to an X2 interface. Note that in FIG. 1, two base stations are included in the mobile communication system 1 by way of illustration. However, the number of base stations included in the mobile communication system 1 is not limited to two. Similarly, the number of mobile stations included in the mobile communication system 1 is not limited to one.

The base stations 2-1 and 2-2 are devices for relaying communication between the mobile station 4 and the upper node device 3. Each of the base stations 2-1 and 2-2 corresponds to, for example, Evolved Universal Terrestrial Radio Access Network (E-UTRAN) NodeB (eNB) in LTE. The base stations 2-1 and 2-2 set a plurality of cells by using a plurality of frequencies for areas in which the base stations and mobile stations are communicable with each other. For example, the base station 2-1 sets three cells 2a, 2b and 2c, and the base station 2-2 sets three cells 2d, 2e, and 2f. Furthermore, each base station may include, for example, a plurality of directional antennas oriented in different directions from each other, divide communicable areas thereof into a plurality of sectors by transmitting and receiving radio signals for each antenna, and set each sector as one cell. In this case, each base station may divide each of the plurality of cells into a plurality of sectors by assigning one or more radio frequencies to each sector.

The upper node device 3 is a device for relaying communication signals between the mobile station 4 and the base station 2-1 to another upper node device. The upper node device 3 corresponds to, for example, Mobility Management Entity (MME) and/or Serving Gateway (S-GW) in LTE-Advanced.

When the mobile station 4 enters a cell set by any of base stations, the mobile station 4 becomes wirelessly communicable with a base station which covers the cell. Furthermore, when the mobile station 4 starts a communication session through the base station which has become wirelessly communicable, uplink signals transmitted from the mobile station 4 are transmitted through the wirelessly connected base station to the upper node device 3. The upper node device 3 routes the received uplink signals, for example, to transmit to another upper node device (not illustrated) through a core network. Furthermore, the upper node device 3 transmits downlink signals received from another upper node device through the core network to the mobile station 4 through the base station wirelessly connected to the mobile station 4.

For example, in FIG. 1, since the mobile station 4 is located in the cell 2b set by the base station 2-1, the mobile station 4 is wirelessly communicable with the base station 2-1. The mobile station 4 may change Quality of Service (QoS) to be requested to the base station 2-1 so as to make it better than before, such as a case in which an application to receive a large amount of data is activated in the mobile station 4. In such a case, the mobile communication system 1 performs a cell addition process to decide whether or not the mobile station 4 can additionally use other cells, for example the cell 2a or 2c, set by the base station 2-1 according to the CoMP technology or the CA technology. Note that the mobile communication system 1 may perform the cell addition process to a mobile station which has already been in radio communication through a plurality of cells set by one base station, in order to add cells additionally used for communication.

Figure 2:
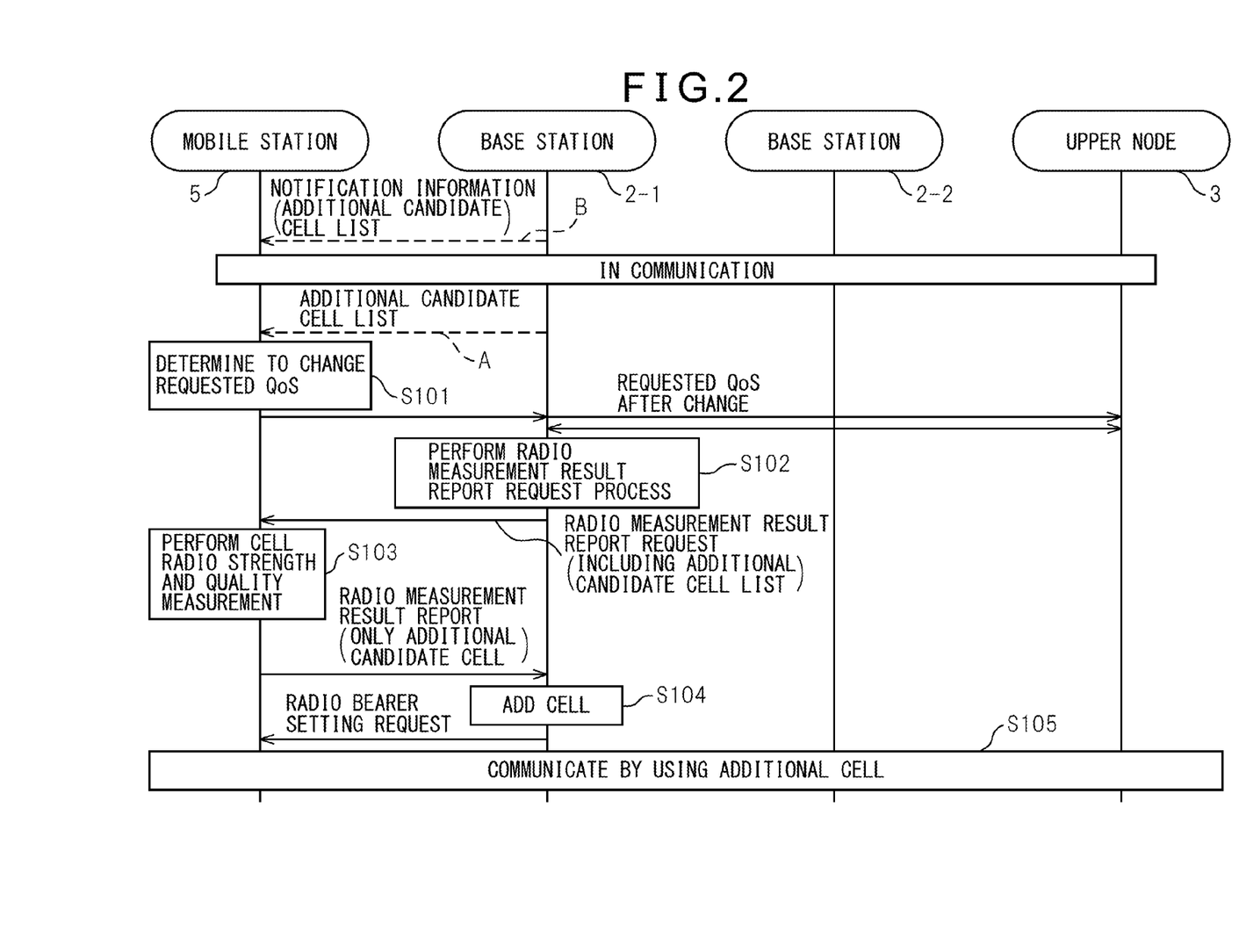
FIG. 2 is an operational sequence diagram of a cell addition process.

FIG. 2 is an operational sequence diagram of the cell addition process in the mobile communication system 1. Note that the mobile station 4 is in communication through the base station 2-1 and the upper node device 3 by way of illustration.

The mobile station 4 determines whether or not it is preferred to change QoS that is guaranteed for a communication in progress at present (step S101). For example, the mobile station 4 determines that it is preferred to change the QoS when a download of a large amount of data such as moving images of high definition is about to be started or when an application involving data transmission and reception has been activated on the mobile station 4.

When having determined that it is preferred to change the QoS, the mobile station 4 transmits a signal representing a requested QoS after the change to the upper node device 3 through the base station 2-1. Note that the requested QoS after the change includes, for example, a maximum transmission rate.

Upon reception of the signal representing the requested QoS after the change, the base station 2-1 and the upper node device 3 determines whether or not the requested QoS represented by the signal can be satisfied. For example, the base station 2-1 determines whether or not resources can be assigned to communication with the mobile station 4 to satisfy the requested QoS from the mobile station 4 based on a number of mobile stations in communication through the base station 2-1 and a throughput of the base station 2-1. Then the base station 2-1 determines that the requested QoS after the change can be satisfied when other mobile stations being in communication will not be affected even when resources assigned to the mobile station 4 are increased.

When the base station 2-1 determines that the requested QoS after the change from the mobile station 4 can be satisfied, the base station 2-1 performs a radio measurement result report request process (step S102). The base station 2-1 transmits a radio measurement result report request signal to the mobile station 4. The radio measurement result report request signal includes report criteria, frequency bands to be measured, and an additional candidate cell list including identification numbers of cells set by the base station 2-1. Note that the radio measurement result report request process and the radio measurement result report request signal will be described later in detail.

Upon reception of the radio measurement result report request signal, the mobile station 4 performs a cell radio strength and quality measurement (step S103). Then, the mobile station 4 transmits to the base station 2-1 a radio measurement result report signal including identification numbers of cells, among detected cells, which are set by the base station 2-1 being currently in communication and in which reception states of radio signals satisfy the report criteria. The mobile station 4 does not report on cells set by base stations other than the base station 2-1, for example, the base station 2-2, even though they are such cells in which reception states of radio signals satisfy the report criteria. Note that the cell radio strength and quality measurement will be described later in detail.

The base station 2-1 checks whether or not the identification numbers of the cells included in the radio measurement result report signal received from the mobile station 4 match the identification numbers of the cells set by itself. When the identification numbers of the cells included in the radio measurement result report signal match some of the identification numbers of the cells set by itself, the base station 2-1 adds the cells to cells which are used for communication with the mobile station 4 (step S104). Then, the base station 2-1 transmits to the mobile station 4 a radio bearer set request signal including information about the cells to be added (for example, the identification numbers of the cells).

Upon reception of the radio bearer set request signal, the mobile station 4 sets, referring to information about additional cells included in the signal, the additional cells to use for communication. Then, the mobile station 4 and the base station 2-1 perform communication, using the additional cells together with a cell which has been used for communication (step S105).

Note that, as illustrated by dotted line A, the base station 2-1 may notify of an additional candidate cell list the mobile station 4 through a dedicated control channel at any timing, other than the radio measurement result report signal. For example, the base station 2-1 may notify the mobile station 4 of the additional candidate cell list when a call setting to the mobile station 4 is performed or when a handover to a cell set by the base station 2-1 is completed.

As in the aforementioned embodiment or variations thereof, only mobile stations which are possible to add cells receive an additional candidate cell list, by base stations notifying of the additional candidate cell list the mobile stations being in radio communication through dedicated control channels. As a result, mobile stations are not required to store unnecessary information since the additional candidate cell list may be stored only when there is a possibility that an addition of cells is preferred.

Alternatively, as illustrated by dotted line B, the base station 2-1 may include the additional candidate cell list in notification information to be sent, through a common control channel, to all mobile stations located in cells set by the base station 2-1. In this modified embodiment, the base station can notify mobile stations located in cells set by itself of the additional candidate cell list, regardless of whether or not mobile stations are in communication through the cells set by the base station. Thus, the base station may not individually notify each mobile station of the additional candidate cell list. Therefore, the base station can simplify control to notify mobile stations of the additional candidate cell list.

Hereinafter, a base station and a mobile station included in a mobile communication system according to the present embodiment will be explained in detail.

Figure 3:
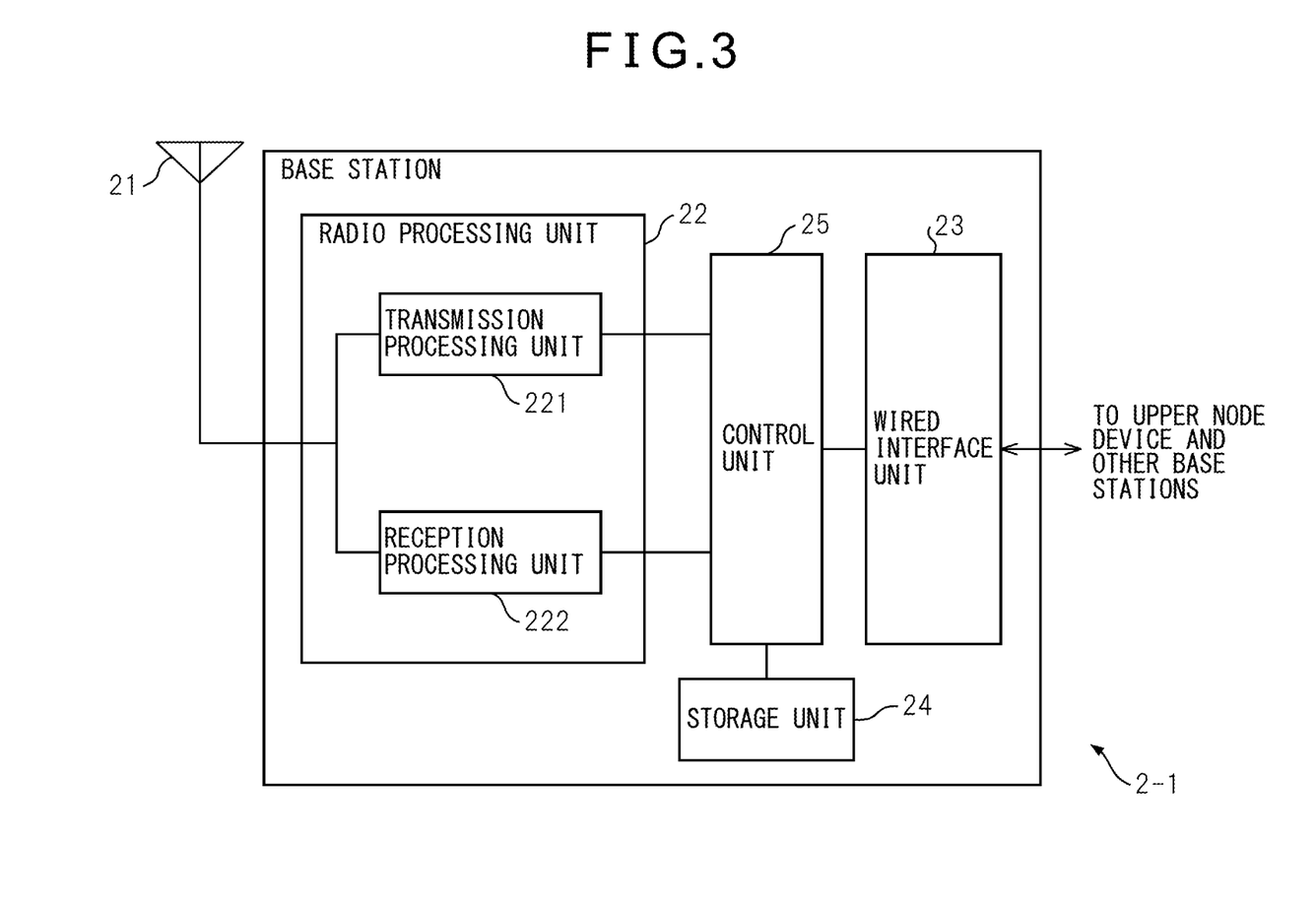
FIG. 3 is a schematic diagram of a base station.

FIG. 3 is a schematic diagram of the base station 2-1. Note that the base station 2-1 and the base station 2-2 have a similar structure and function. Thus, a detailed explanation of the base station 2-2 will be omitted in the following.

The base station 2-1 includes an antenna 21, a radio processing unit 22, a wired interface unit 23, a memory unit 24, and a control unit 25. The radio processing unit 22 includes a transmission processing unit 221 and a reception processing unit 222. The radio processing unit 22, the wired interface unit 23, the memory unit 24, and the control unit 25 are each formed as a dedicated circuit. Alternatively, each of these units may be implemented in the base station 2-1 as an integrated circuit on which circuits corresponding to the respective units are integrated.

The antenna 21 transmits, as radio signals, downlink signals transferred from the transmission processing unit 221 through a duplexer (not illustrated). The antenna 21 also receives uplink signals, which are radio signals transmitted from the mobile station 4, to transform into an electrical signal and transfers the uplink signals transformed into the electrical signal to the reception processing unit 222 through the duplexer.

After having converted the multiplexed downlink signals received from the control unit 25 into an analogue signal, the transmission processing unit 221 of the radio processing unit 22 superimposes the signal on a carrier having a radio frequency specified by the control unit 25. Then the transmission processing unit 221 amplifies the downlink signals superimposed on the carrier with a high powered amplifier (not illustrated) to a desired level and transfers the signal to the antenna 21 through the duplexer.

The reception processing unit 222 of the radio processing unit 22 amplifies the uplink signals received from the antenna 21 through the duplexer with a low noise amplifier (not illustrated). The reception processing unit 222 converts a frequency of the uplink signals from a radio frequency to a baseband frequency by multiplying the amplifies uplink signals by a periodic signal having an intermediate frequency. Then, after having performed an analogue to digital conversion on the uplink signals having the baseband frequency, the reception processing unit 222 passes the uplink signals to the control unit 25.

The wired interface unit 23 includes a communication interface circuit for connecting the base station 2-1 with the upper node device 3 and other base stations. The wired interface unit 23 analyzes the signal received from the upper node device 3 according to the S1 interface and extracts the downlink signals and a control signal included in the signal. Furthermore, the wired interface unit 23 analyzes signals received from other base stations, for example, the base station 2-2, according to the X2 interface and extracts control signals (for example, a control signal for performing a handover process) included in the signals. Then, the wired interface unit 23 passes the extracted downlink signals and the control signal for the base station 2-1 to the control unit 25.

On the other hand, the wired interface unit 23 converts the uplink signals received from the control unit 25 to signals in a form conforming to the S1 interface to output to the upper node device 3. Furthermore, the wired interface unit 23 converts control signals to be transmitted to other base stations to a form conforming to the X2 interface. Then the wired interface unit 23 outputs the control signals to the other base stations.

The storage unit 24 includes, for example, a rewritable non-volatile semiconductor memory or a volatile semiconductor memory. The storage unit 24 stores various types of information used for control for wirelessly connecting mobile stations such as identification numbers of respective cells set by the base station 2-1 and radio frequencies used in respective cells. Furthermore, the storage unit 24 may temporarily store uplink signals or downlink signals.

The control unit 25 includes, for example, one or a plurality of processors and peripheral circuits thereof. The control unit 25 performs baseband processing on the uplink signals and the downlink signals. The control unit 25 performs processing such as error correction coding on the downlink signals received from the wired interface unit 23. Furthermore, the control unit 25 modulates the downlink signals according to a predetermined modulation scheme and multiplexes the signals. Note that the multiplexing scheme may be, for example, Orthogonal Frequency-Division Multiplexing (OFDM). Then, the control unit 25 passes the modulated and multiplexed downlink signals to the transmission processing unit 221 of the radio processing unit 22.

On the other hand, the control unit 25 demultiplexes the uplink signals received from the reception processing unit 222 according to a predetermined multiplexing scheme and demodulates each of the demultiplexed uplink signals to perform error correction decoding. Then, the control unit 25 outputs the decoded uplink signals to the wired interface unit 23. Furthermore, the control unit 25 extracts control signals to be referenced by the base station 2-1 from the decoded uplink signals. Note that a multiplexing scheme for the uplink signals may be Single Carrier Frequency Division Multiplexing Access (SC-FDMA).

In addition, the control unit 25 manages an amount of resources being used, a number of mobile stations being wirelessly connected, and the like for each cell set by the base station 2-1.

Furthermore, the control unit 25 performs processing for wirelessly connecting the base station 2-1 with mobile stations such as a communication link setting to a mobile station entering a cell set by the base station 2-1 and handover processing. Furthermore, the control unit 25 may perform processing of a retransmission control, a sequence alignment, and the like for downlink signals. Furthermore, the control unit 25 selects a modulation scheme and performs a transmission power control.

The control unit 25 generates control signals for performing the above-described processing to be included in the downlink signals. Furthermore, the control unit 25 passes control signals to be transmitted to the upper node device 3 or other base stations to the wired interface unit 23.

Furthermore, the control unit 25 performs the radio measurement result report request process.

Figure 4:
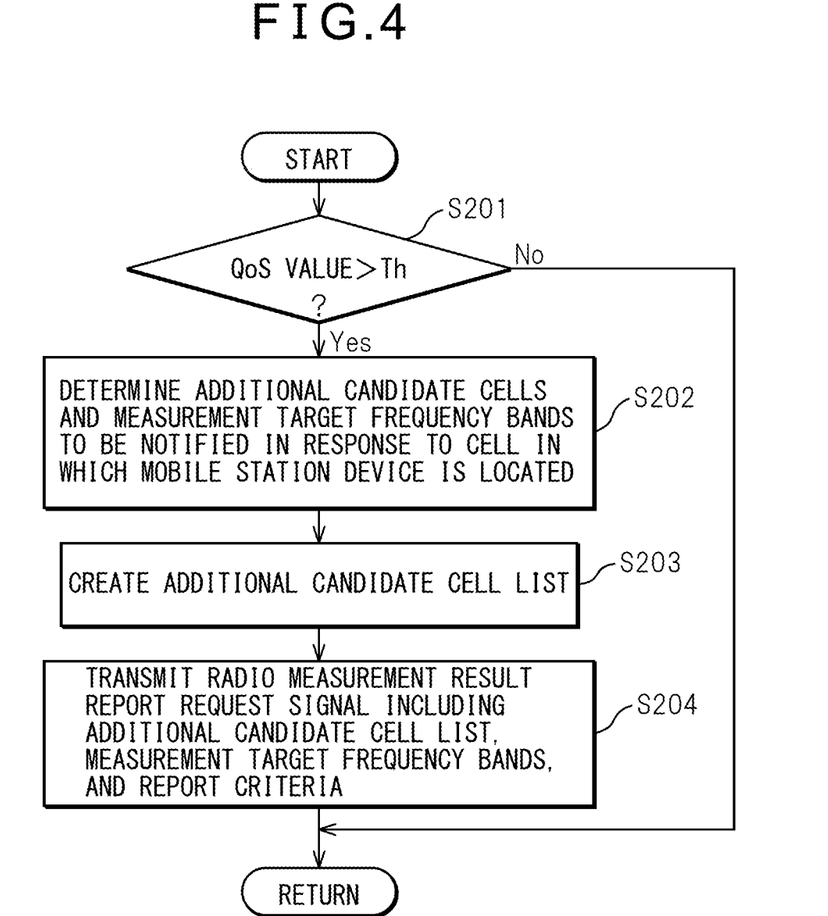
FIG. 4 is a flowchart of a radio measurement result report request process performed by a control unit of the base station.

FIG. 4 is an operational flowchart of the radio measurement result report request process to be performed by the control unit 25. The control unit 25 determines whether or not a QoS value requested by the mobile station 4 being in radio communication through cells being set by the base station 2-1 is greater than a threshold value Th corresponding to a level at which addition of a cell is preferred (step S201). The QoS value may be, for example, a maximum transmission rate which the mobile station 4 requests. The threshold value Th is set to a maximum transmission rate achievable by adjusting scheduling and the like when, for example, only cells which are currently in use can be used.

When the requested QoS value is less than the threshold value Th (No in step S201), the control unit 25 determines that it is not necessary to newly add a cell to be used to communicate with the mobile station 4. Then the control unit 25 terminates the radio measurement result report request process.

On the other hand, when the requested QoS value is greater than the threshold value Th (Yes in step S201), the control unit 25 determines additional candidate cells and measurement target frequency bands, which can be used for radio communication with the mobile station 4, based on the cell in which the mobile station 4 is located (step S202). In order to determine the additional candidate cells and the measurement target frequency bands, a reference table is created in advance, which represents, for example, for each of a plurality of cells set by the base station 2-1, relationship between an identification number of the cell and identification numbers of the additional candidate cells, usable frequency bands, and report criteria. The reference table is stored in the memory unit 24. Note that the report criteria are reference values against measured values of reception states of radio signals in order to determine whether or not a mobile station having performed a cell radio strength and quality measurement reports identification numbers of detected cells to a base station. The control unit 25 identifies, by referring to the reference table, identification numbers of additional candidate cells, measurement target frequency bands, and report criteria corresponding to identification numbers of cells in which the mobile station 4 is currently located.

The control unit 25 creates the additional candidate cell list which is a list including identification numbers of all additional candidate cells (step S203). Then, the control unit 25 creates a radio measurement result report request signal including the additional candidate cell list, the measurement target frequency bands, and the report criteria and transmits the radio measurement result report request signal to the mobile station 4 (step S204). Then the control unit 25 terminates the radio measurement result report request process.

Figure 5:
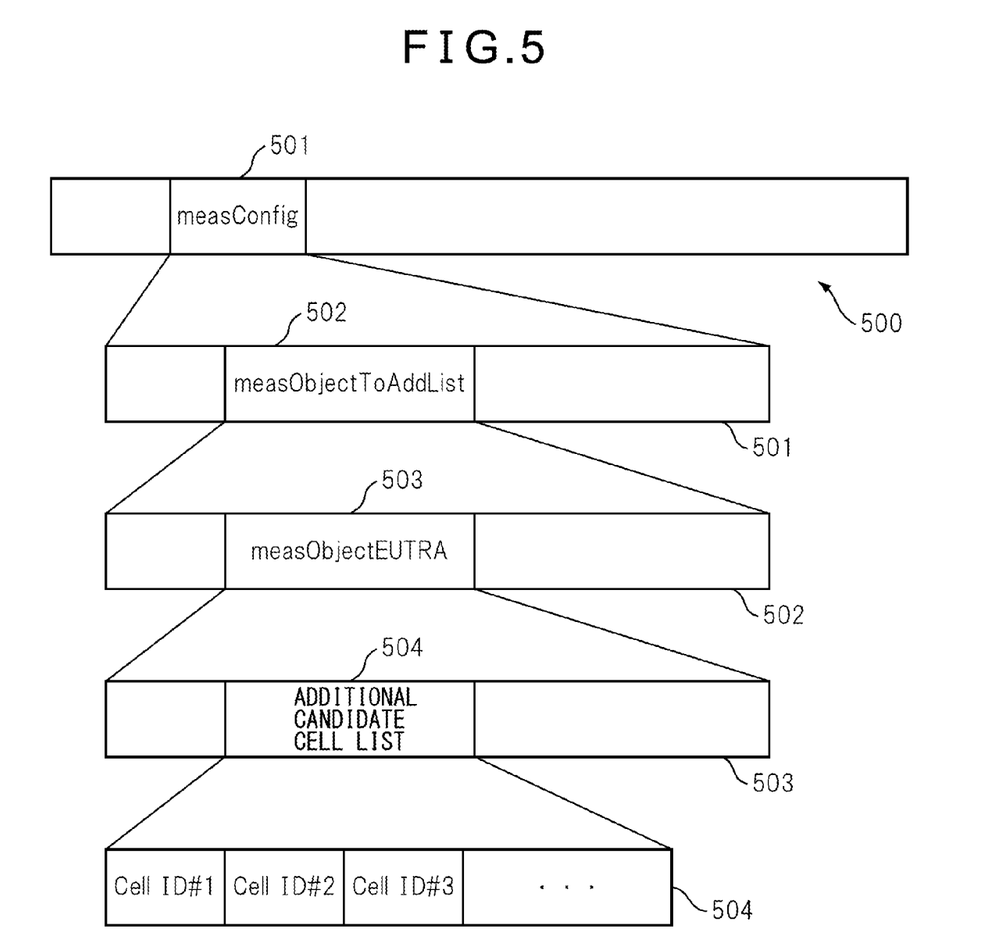
FIG. 5 is a diagram illustrating an outline of a radio measurement result report request message.

FIG. 5 is a schematic configuration diagram of an example of the radio measurement result report request signal. In this example, the radio measurement result report request signal is a Connection Reconfiguration message of RRC to be transmitted to a mobile station through a Dedicated Control Channel (DCCH). Note that the Connection Reconfiguration message is defined, for example, in 3GPP TS 36.331 v10.1.0 (issued in March, 2011). The report criteria and the measurement target frequency bands are included in elements which have been defined in the Connection Reconfiguration message. Meanwhile, the additional candidate cell list is defined in FIG. 5 and as described below.

A radio measurement result report request signal 500 includes an element measConfig 501 which describes detailed conditions with regard to radio measurement. The measConfig 501 includes an element measObjectToAddModList 502 which describes information to be further added to information notified when the previous radio measurement result report was requested. The measObjectToAddModList 502 includes an element MeasObjectEUTRA 503 which describes information related to LTE among additional information. Included in the MeasObjectEUTRA 503 is an additional candidate cell list 504 which includes identification numbers (for example, cellID#1, cellID#2, and the like) of cells of a same base station which are report targets.

Note that, as described above, when the additional candidate cell list is notified to a mobile station separately from the radio measurement result report request signal, the radio measurement result report request signal may include, instead of the additional candidate cell list, an additional candidate measurement flag indicating that only cells included in the additional candidate cell list are report targets.

Figure 6:
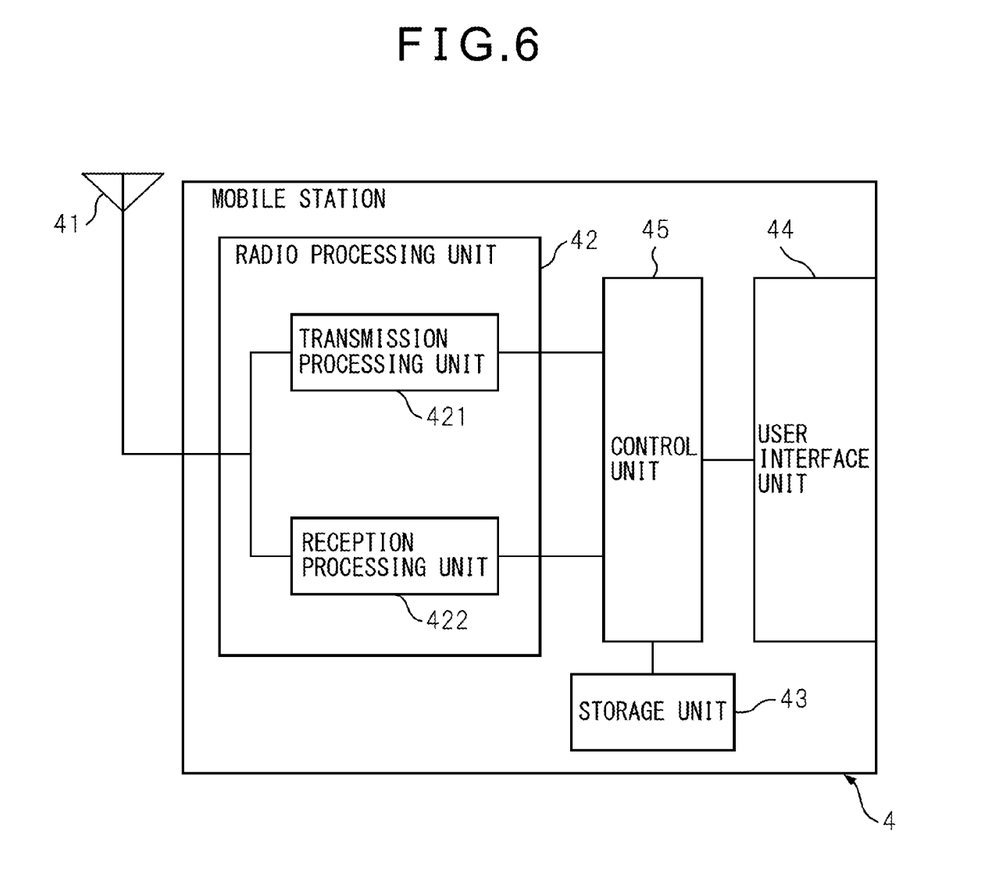
FIG. 6 is a schematic diagram of a mobile station.

FIG. 6 is a schematic diagram of the mobile station 4. The mobile station 4 includes an antenna 41, a radio processing unit 42, a storage unit 43, a user interface unit 44, and a control unit 45. The radio processing unit 42 includes a transmission processing unit 421 and a reception processing unit 422. Among the units, the radio processing unit 42, the storage unit 43, and the control unit 45 are each formed as a separate circuit. Alternatively, each of these units may be implemented in the mobile station 4 as an integrated circuit on which circuits corresponding to respective units are integrated.

The radio processing unit 42 and a part of the control unit 45, which realizes a function of the baseband processing, have the same functions as the radio processing unit 22 and the control unit 25 of the base station 2-1 illustrated in FIG. 3 respectively, except for the multiplexing scheme to be applied. Thus, detailed description of the baseband processing performed by the radio processing 42 and the control unit 45 is omitted.

Note that the control unit 45 multiplexes the uplink signals according to, for example, the SC-FDMA scheme. The control unit 45 demultiplexes the multiplexed downlink signals by, for example, the OFDMA scheme.

The storage unit 43 includes, for example, a rewritable non-volatile memory or a volatile memory. The storage unit 43 stores various types of information to be used for control for wirelessly communicating with a base station. For example, the storage unit 43 stores additional candidate cell lists, measurement target frequency bands, and report criteria notified from base stations.

The control unit 45 includes one or a plurality of processors and peripheral circuits thereof and performs processing, such as communication link setting, handover processing and the like, for wirelessly connecting the mobile station 4 with any of base stations. The control unit 45 generates control signals for performing wireless connections between the mobile station 4 and base stations. Furthermore, the control unit 45 performs processing corresponding to control signals received from base stations.

Furthermore, the control unit 45 generates uplink signals which include voice signals or data obtained through the user interface unit 44 including a microphone (not illustrated), a keypad (not illustrated), or the like. Then, after performing processing such as information source encoding processing on the generated uplink signals, the control unit 45 performs the baseband processing such as modulation and multiplexing on the uplink signals. Furthermore, the control unit 45 performs processing such as demultiplexing, demodulation, and information source decoding to the downlink signals received from base stations which are wirelessly connected. Then, the control unit 45 extracts audio signals, video signals, or data from the demodulated downlink signals. The control unit 45 replays the extracted audio signals through a speaker (not illustrated) included in the user interface unit 44 or displays the motion picture signals and the data on a display (not illustrated) included in the user interface unit 44.

Furthermore, the control unit 45 executes various types of application programs implemented in the mobile station 4. The control unit 45 also determines whether or not QoS being requested to a base station in communication is changed, at a time of activation of an application program or based on a user operation during execution of an application program or the like. The control unit 45 generates a control signal including a value representing the QoS every time the QoS is changed and transmits the control signal to the base station currently in communication through the radio processing unit 42 and the antenna 41.

Having received a radio measurement result report request signal from the base station, the control unit 45 extracts an additional candidate cell list included in the radio measurement result report request signal and stores the additional candidate cell list in the memory unit 43. Note that the control unit 45 stores the reported additional candidate cell list in the storage unit 43 even when the additional candidate cell list is reported to the mobile station 4 separately from the radio measurement result report request signal. Note that it is preferable that the control unit 45 store only the additional candidate cell list which has been received last in the storage unit 43.

Furthermore, having received the additional candidate cell list or the radio measurement result report request signal including an additional candidate measurement flag, the control unit 45 performs a cell radio strength and quality measurement in which only additional candidate cells are report targets. The cell radio strength and quality measurement is also performed, for example, when a handover is executed. However, in the following, the cell radio strength and quality measurement will be explained which is performed to decide whether or not other cells of the base station is newly added, the base station setting the cell in which the mobile station 4 is located, while the mobile station 4 is in communication.

Figure 7:
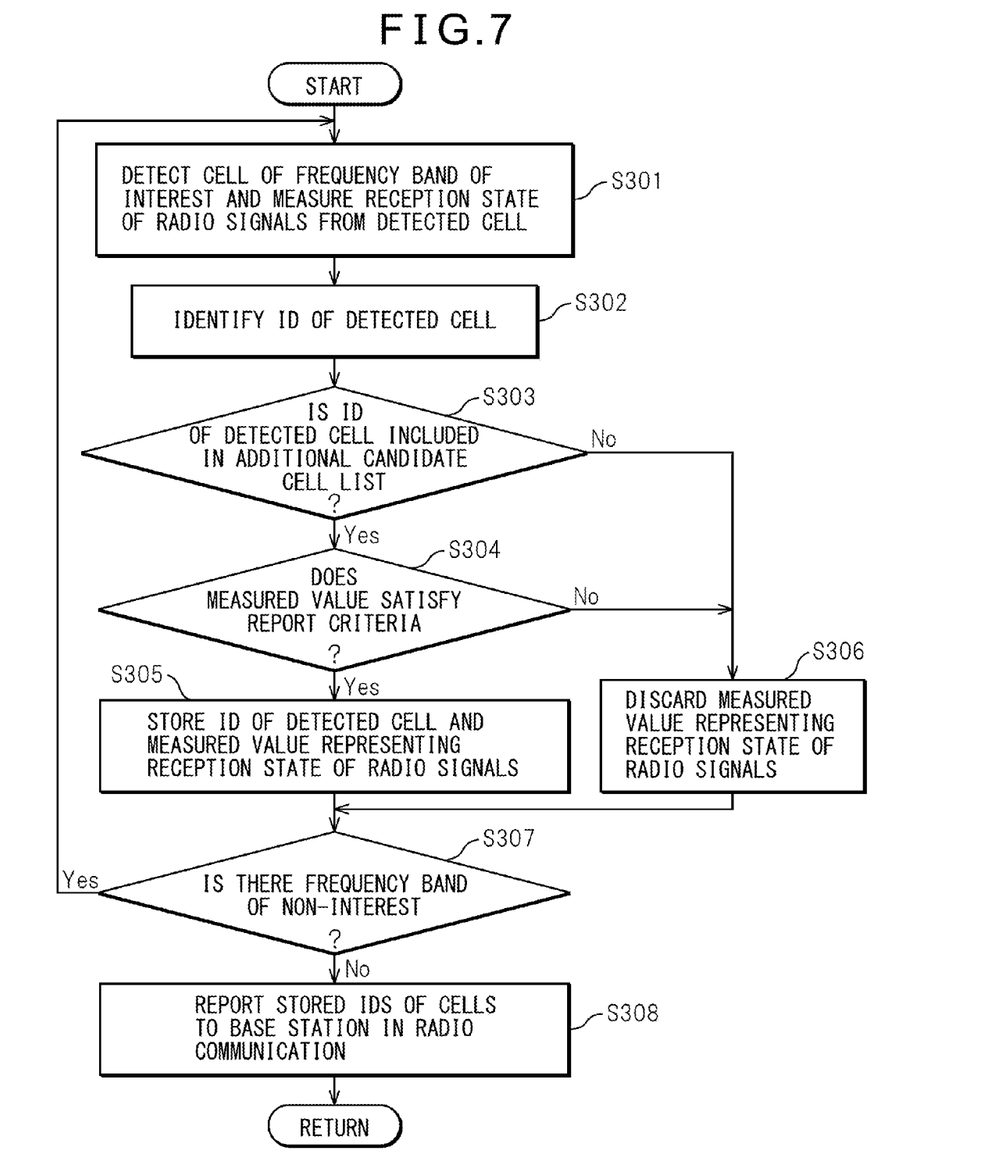
FIG. 7 is a flowchart of a radio strength and quality measurement process performed by a control unit of the mobile station.

FIG. 7 is an operational flowchart of a radio strength and quality measurement performed by the control unit 45 of the mobile station 4.

The control unit 45 detects cell with respect to frequency band of interest among frequency bands of measurement targets notified by a base station and measures reception state of radio signals for the detected cell (step S301). For example, the control unit 45 detects cell by detecting reference signals included in signals of a synchronous channel transmitted from the base station with respect to the frequency band of interest. The control unit 45 obtains reception signal power (i.e., Reference Signal Received Power, RSRP) of the reference signal as an example of a measured value representing a reception state of radio signals. The control unit 45 also may measure a ratio of an RSRP and a reception signal strength indicator of a carrier as Reference Signal Received Quality (RSRQ) which is another example representing a reception state of radio signals. Note that the reception signal strength indicator represents total reception power including power of a same channel, power from other noise sources, and unnecessary power from serving cells.

The control unit 45 identifies an identification number of the detected cell (step S302). For example, a reference signal transmitted from a base station has been scrambled by a scrambling signal uniquely determined for each identification number of a cell. Thus, based on the scrambled signal at a time when the reference signal has been detected, the control unit 45 can identify the identification number of the cell.

The control unit 45 determines whether or not the identification number of the detected cell is included in the additional candidate cell list (step S303).

When the identification number of the detected cell is not included in the additional candidate cell list (No in step S303), the control unit 45 discards the measured value of the reception state of the radio signal (step S306). In this case, the detected cell is a cell set by a base station different from the base station in radio communication with the mobile station 4 or a cell which, although is set by the base station in radio communication with the mobile station 4, is not an additional candidate cell. Accordingly, since the detected cell will not be used for communication with the mobile station 4, the identification number will be discarded at the base station even when the mobile station 4 reports the identification number of the detected cell to the base station. The mobile station 4 can suppress an increase of a use amount of radio resources and can reduce a processing load of the base station, by the mobile station 4 itself not reporting the identification number of the detected cell and the measured value of the reception state and discarding the measured value of the reception state.

On the other hand, when the identification number of the detected cell is included in the additional candidate cell list (Yes in step S303), i.e., when the identification number of the detected cell matches any of identification numbers of the additional candidate cells, the detected cell is one of the additional candidate cells. Then, the control unit 45 determines whether or not the measured value representing the reception state of the radio signals of the detected cell satisfies the report criteria (step S304). When the measured value representing the reception state of the radio signals of the detected cell does not satisfy the report criteria (No in step S304), the control unit 45 discards the measured value (step S306).

On the other hand, when the measured value representing the reception state of the radio signal of the detected cell satisfies the report criteria (Yes in step S304), the control unit 45 stores the identification number and the measured value representing the reception state of the radio signals of the detected cell in the memory unit 43.

After step S305 or S306, the control unit 45 determines whether or not frequency band of non-interest among the frequency bands of the measurement target notified by the base station remains (step S307). When the frequency band of non-interest remains (Yes in step S307), the control unit 45 sets any of the frequency bands of non-interest as a frequency band of interest. Then the control unit 45 repeats processing of step S301 and thereafter.

On the other hand, when the frequency band of non-interest do not remain (No in step S307), the control unit 45 generates the radio measurement result report signal which includes the identification numbers of the cells which are stored in the memory unit 43, the cells satisfying the report criteria. The radio measurement result report signal may also include the measured values representing the reception states of the radio signals such as reception signal power or reception signal quality of the cells which satisfies the report criteria. Note that the radio measurement result report signal may be, for example, Measurement Report which is one of Radio Resource Control (RRC) messages. Then, the control unit 45 transmits the radio measurement result report signal to the base station being in radio communication (step 308).

Note that, when there are no cells which satisfy the report criteria, the control unit 45 may stop the cell radio strength and quality measurement for a predetermined period, and may then repeat processing of step S301 and thereafter again. In this case, the predetermined period may be a period set, for example, by the base station and notified through the radio measurement result report signal, the period being several seconds to several minutes for example.

Then, the control unit 45 terminates the cell radio strength and quality measurement process. Note that the control unit 45 may alter the execution sequence of processes of steps S301 and S302. When the mobile station performs the cell radio strength and quality measurement to move from the cell currently positioned to another cell, for example, when a handover is executed, the control unit 45 may, for example, omit process of step S303 in the above-mentioned operational flow.

As has been described above, in a cell radio strength and quality measurement in the mobile communication system, which is performed when a mobile station in radio communication with any of base stations determines whether or not a new cell to use for the radio communication can be added, measurement results of cells which are not additional candidates are not reported to the base station. Accordingly, the mobile communication system can suppress an increase of a use amount of radio resources associated with the cell radio strength and quality measurement and reduce a processing load of base stations.

Note that the present invention is not limited to the embodiments described above. For example, according to a modified embodiment, a base station may be divided into plurality of Radio Equipment (RE) and a Radio Equipment Controller (REC) items. In this case, each RE includes a radio processing unit and an antenna among components of the base station illustrated in FIG. 3, while REC includes components excluding the radio processing unit and the antenna among components of the base station illustrated in FIG. 3. Each RE and REC are, for example, connected through signal lines such as optical fiber cable and are communicable with each other according to Common Public Radio Interface (CPRI) and each RE sets one or more cells.

Since a delay due to communication between REC and RE is less than a delay due to signaling between base stations and the like, the mobile communication system can perform a coordinated multi-point transmission/reception using plurality items of RE. Accordingly, in the modified embodiment, when REC notifies an additional candidate cell list is notified to mobile stations in communication through cells of any of plurality items of RE connected to REC, REC may include cells of other REs connected to REC in an additional candidate cell list.

Furthermore, according to another modified embodiment, a control unit of a base station may select an additional candidate cell in accordance with a communication volume of each cell of the base station when notifying of an additional candidate cell list, through a dedicated control channel, mobile stations in communication through cells of the base station. For example, when creating an additional candidate cell list, a control unit of a base station may add, to the additional candidate cell list, identification numbers of cells the communication volume of which is less than or equal to a predetermined threshold value by finding a communication volume of each cell. Thereby the base station can utilize cells having a relatively small communication volume for communication with mobile stations already in communication.

All examples and specific terms recited herein are intended for pedagogical purposes to aid the reader in understanding the invention and the concepts contributed by the inventor to furthering the invention and the art, and are to be construed as being without limitation to such specifically recited examples and conditions, nor does the organization of such examples in the specification relate to a showing of the superiority and inferiority of the invention. Although the embodiments of the present invention have been described in detail, it is to be understood that the various changes, substitutions, and alterations could be made hereto without departing from the spirit and scope of the invention.

What is claimed is:

1. A mobile communication system comprising a base station which sets a plurality of cells and a mobile station, wherein:
   the base station notifies the mobile station in communication through a first cell of the plurality of cells, of identification information of at least one cell of the plurality of cells which can be used to communicate with the mobile station and information of a frequency band to be measured, and provides an instruction to the mobile station in communication through the first cell to measure a reception state of a radio signal together with a reference value for a measured value of a reception state of a cell, in the plurality of cells, to be a report target; and
   the mobile station detects a cell, in the plurality of cells, transmitting the radio signal which the mobile station is able to receive, based on the information of the frequency band to be measured in response to the instruction from the base station and, only when identification information of the detected cell matches any of the identification information of the at least one cell and the measured value of the reception state of the detected cell satisfies the reference value, notifies the base station of the identification information of the detected cell to be the report target.

2. The mobile communication system according to claim 1, wherein
   the base station notifies the mobile station of the instruction together with the identification information of the at least one cell.

3. The mobile communication system according to claim 1, wherein
   the base station notifies all mobile stations located in the first cell of the identification information of the at least one cell through a common channel used in common.

4. The mobile communication system according to claim 3, wherein
   the instruction from the base station includes an instruction to cause the mobile station to notify the base station of the identification information of the detected cell only when the identification information of the detected cell matches any of the identification information of the at least one cell.

5. The mobile communication system according to claim 2, wherein
   the base station provides the instruction when it is determined that a transmission rate assigned to the mobile station in communication through the first cell is not sufficient to perform the communication.

6. A mobile station comprising:
   a storage unit which stores identification information of at least one cell which the mobile station is capable to use for communication, among a plurality of cells which a base station sets, and information of a frequency band to be measured, the identification information and the information of the frequency band to be measured being notified from the base station which is in communication with the mobile station through a first cell of the plurality of cells; and
   a control unit which, when the mobile station is instructed by the base station to measure a reception state of a radio signal and a reference value for a measured value of the reception state of a cell, in the plurality of cells, to be a report target is notified from the base station, detects a cell, in the plurality of cells, transmitting radio signals through which the mobile station is capable of receiving, based on the information of the frequency band to be measured, and, only when identification information of the detected cell matches any of the identification information of the at least one cell and the measured value of the reception state of the detected cell satisfies the reference value, notifies the base station of the identification information of the detected cell as the report target.

7. The mobile station according to claim 6, wherein
   the identification information of the at least one cell as well as the instruction are notified from the base station and
   the control unit stores the notified identification information of the at least one cell in the storage unit.

* * * * *